(12) United States Patent  
Weber et al.

(10) Patent No.: US 8,430,581 B2
(45) Date of Patent: Apr. 30, 2013

(54) CAMERA LENS ASSEMBLY AND ADAPTATION SET

(75) Inventors: Uwe Weber, Aalen (DE); Holger Sehr, Weimar (DE); Helmut Lenhof, Steinheim (DE)

(73) Assignee: Carl Zeiss AG, Oberkochen (DE)

( * ) Notice: Subject to any disclaimer, the term of this patent is extended or adjusted under 35 U.S.C. 154(b) by 66 days.

(21) Appl. No.: 13/023,972

(22) Filed: Feb. 9, 2011

(65) Prior Publication Data

US 2011/0249966 A1  Oct. 13, 2011

Related U.S. Application Data

(60) Provisional application No. 61/282,847, filed on Apr. 9, 2010.

(51) Int. Cl.
    *G03B 17/00* (2006.01)
(52) U.S. Cl.
    USPC .............................. 396/530; 396/71
(58) Field of Classification Search ............ 396/71, 396/529, 530, 531
    See application file for complete search history.

(56) References Cited

U.S. PATENT DOCUMENTS

| 3,838,437 A | 9/1974 | Hamm |
| 4,017,878 A | 4/1977 | Hagiwara |
| 4,466,019 A * | 8/1984 | Sakashita ..................... 348/375 |
| 4,565,434 A | 1/1986 | Notagashira |
| 4,766,453 A | 8/1988 | Shiokama et al. |
| 5,734,935 A * | 3/1998 | Imanari et al. .................. 396/71 |
| 6,089,761 A | 7/2000 | Sakurai |
| 7,085,485 B2 | 8/2006 | Sugita et al. |
| 7,118,295 B2 | 10/2006 | Koyama et al. |
| 7,756,405 B2 * | 7/2010 | Iikawa ............................ 396/25 |
| 2009/0110381 A1 * | 4/2009 | Yang ............................... 396/71 |

FOREIGN PATENT DOCUMENTS

| DE | 84 11 748 U1 | 9/1984 |
| JP | 2005-140846 A | 6/2005 |
| WO | WO 99/10773 A1 | 3/1999 |

OTHER PUBLICATIONS

English translation of the Office action of the German Patent Office dated Oct. 5, 2010 in corresponding German patent application 10 2010 014 581.5.

Abrams, J., "Zeiss Canon Mount Compact Primes. Spring 2010", cinema5D news, Feb. 18, 2010, pp. 1 to 4, http://www.cinema5d.com/news/?p=2513.

* cited by examiner

*Primary Examiner* — Rodney Fuller
(74) *Attorney, Agent, or Firm* — Walter Ottesen

(57) ABSTRACT

A camera lens assembly includes a focusing mount having a receiving lug and optical elements, which are arranged in the focusing mount, and define an optical axis. An adapter ring has a first planar surface and a second planar surface which are parallel to each other. The first planar surface is in contact engagement against a camera-side contact surface of the focus mount and the second planar surface is in contact with a lens-side contact surface of a lens mount. The lens mount has a tubular-shaped lens mount socket and lens mount attachment elements which are configured to coact with the camera mount attachment elements of a camera.

24 Claims, 7 Drawing Sheets

US 8,430,581 B2

CAMERA LENS ASSEMBLY AND ADAPTATION SET

CROSS REFERENCE TO RELATED APPLICATION

This application claims priority of U.S. provisional application Ser. No. 61/282,847, filed Apr. 9, 2010, and the entire content of the above application is incorporated herein by reference.

BACKGROUND OF THE INVENTION

A mount is understood as a connection device between a camera and the focusing mount of a lens. A mount includes a first part, the camera mount, and a second part, the lens mount. For example, the connection device can be configured as a connecting thread or a bayonet catch. Known mounts are, for example, the C-Mount, CS-Mount, PL-Mount, EF-Mount, F-Mount, K-Mount, and Alpha-Mount.

It is generally known that lenses for cameras, especially film cameras, comprise a focusing mount and assembled lens mount and are available as such in the marketplace. A particular lens mount can only be combined with a specific camera mount. If a user has cameras having different mounts, the user must purchase suitable lenses for each camera.

Intermediate mounts exist which can be used between a lens mount and a camera mount, so that lens mounts of a first type can be connected to camera mounts of a second type. For example, this is disclosed in U.S. Pat. No. 3,838,437. The disadvantage of this is that for geometrical reasons the known intermediate mounts only allow for very limited interchangeability. DE 84 11 748 U1 describes a three-part adapter for enabling the use of exchangeable lenses on different camera housings.

SUMMARY OF THE INVENTION

Therefore, it is an object of the invention to provide a camera lens which can be connected to a large number of different cameras.

The camera lens assembly of the invention is for coacting with a camera defining an image plane (BE) and camera mount fixing elements. The camera lens assembly includes: a lens mount having a tube-shaped lens mount socket and lens mount fixing elements configured to coact with the camera mount fixing elements; the lens mount having first and second support surfaces; a focusing mount having a first support surface facing the camera and a second support surface facing the lens mount; the first support surface of the focusing mount being at a defined distance from the camera image plane (BE) of $X_{AF-BE} \geq 57.9$ mm when the camera lens assembly is fixed to the camera; an adapter ring having first and second planar surfaces plane parallel to each other; the first planar surface of the adapter ring being in contact engagement with the first support surface of the focusing mount and the second planar surface of the adapter ring being in contact engagement with the second support surface of the lens mount; the focusing mount having a receiving lug having an outer diameter of $D_{AZ, outer} \leq 52$ mm and being adapted for receiving the adapter ring and the focusing mount having optical elements arranged therein and the optical elements defining an optical axis A; a first fixing unit for fixing the adapter ring on the focusing mount; and, a second fixing unit for fixing the lens mount on the adapter ring.

It is a further object of the invention to provide an adaptation set by means of which the camera lens can be connected to a large number of different cameras.

The adaptation set of the invention is for an interchangeable connection of a lens mount selected from a group of differently formed lens mounts on a focusing mount of a camera lens for a camera, each of the lens mounts having a first support surface on the lens side thereof and a second support surface; the focusing mount having a first support surface facing the camera and a second support surface facing the lens mount. The adaptation set includes: an adapter ring having a first and a second planar surface plane parallel with each other; the first planar surface of the adapter ring being placeable against the first support surface of the focusing mount; the second planar surface of the adapter ring being placeable against the first support surface of the lens mount; and, the lens mount having a tube-shaped lens mount socket and a lens mount fixing unit which are configured to coact with a camera mount fixing unit of the camera.

With the user's camera lenses, the user can unscrew or otherwise dismount the provided camera mount in order to mount a differently configured camera mount by means of the adaptation set, that is, the adapter ring or an adapter in general. Furthermore, camera lenses without a camera mount, that is, only the focusing mount equipped with optics, possibly together with an adaptation set, can be sold. Thus, only two components are provided between the focusing mount and the actual camera, that is, the adapter ring and a lens mount configured for the camera. In this way, the lens mount is attached to the camera mounting elements of the camera by means of lens mounting elements. The lens mounting elements and camera mounting elements are configured, for example, as a bayonet catch or threaded coupling.

In this connection, in particular the length of the optical axis and/or the flange focal distance, that is, the distance from a contact surface of the focusing mount on the camera side to an image plane of the camera, does not change, that is, remains constant. This can result when using a different focusing mount with a corresponding lens mount by correspondingly selecting the length of the adapter ring seen in the direction of the optical axis.

Furthermore, possible tolerances are reduced, since only two further components are arranged between the focusing mount and the actual camera, that is, the camera housing. If more components were present, their length tolerances seen in the direction of the optical axis would add up and it could lead to image blurring since the optics of the focusing mount are no longer focused on the image plane.

Also, less elasticity is present, because viewed in the direction of the optical axis, for example, a spring pre-tensioned bayonet catch can be replaced by a lens mount which is attachable to a camera mount by a threaded coupling. The flexural strength transversely to the optical axis is also increased by the small number of required components as compared to other adapter systems.

The adaptation set includes at least the adapter ring. The adapter ring can, for example, be made of anodized aluminum and with the required precision and strength. It can additionally be provided to supplement the adaptation set with one or more lens mounts of different configurations.

Because a distance from a contact surface of the focusing mount on the camera side to the camera image plane of $X_{AF-BE} \geq 57.9$ mm was defined when the camera lens is fixed on a camera and additionally a receiving lug has a defined outer diameter of $D_{AZ, outer} \leq 52$ mm for receiving an adapter ring, a large number of different lenses can be connected to different camera types, without resulting in damage done to the camera, for example, because a lens mount projects too far into the camera and thereby destroys components arranged therein.

The flange focal distance is defined as the distance between the contact surface of the lens mount on the camera side and the image plane of a camera in the mounted condition, that is, when the contact surface on the camera side of the lens mount rests on the corresponding contact surface of the camera mount on the lens side.

Advantageously, the camera lens or the adaption set includes one or more spacer discs, also called shims. These shims can be configured in the form of thin plastic foils or metal rings. For example, one or more shims are arranged between the contact surface of the focusing mount and the adapter ring. For example, if the adapter ring is fixed to the focusing mount via set-screws it is evident that the shim is provided with a number of apertures positioned correspondingly. The thickness of the shims can be just 1/100 mm in order to compensate for dimensional tolerances in the flange focal distance. In this way, optimum focusing of the optics of the focusing mount onto the image plane of the camera can be achieved.

A plurality of different forms can be provided as lens mounts. For example, the invention can be used with PL-Mounts, EF-Mounts, CS-Mounts, C-Mounts, and other mount forms.

In the mounted condition, the mechanical axes of the focusing mount, adapter ring, lens mount, as well as possibly the camera mount coincide with the optical axis of the optical elements of the camera lens.

Because the adapter ring has planar surfaces toward the contact surface of the focusing mount and toward the mount and a defined length parallel to the optical axis A, of, for example, 8.8 mm, the flange focal distance "lens mount to image plane" is optimized in such a manner that the flange focal distance is optimized and/or remains constant for a particular lens even when used with different mounts and cameras for imaging. The adapter ring can have a defined length of 6 to 10 mm in parallel to the optical axis A, preferably between 8.5 mm and 9.5 mm.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
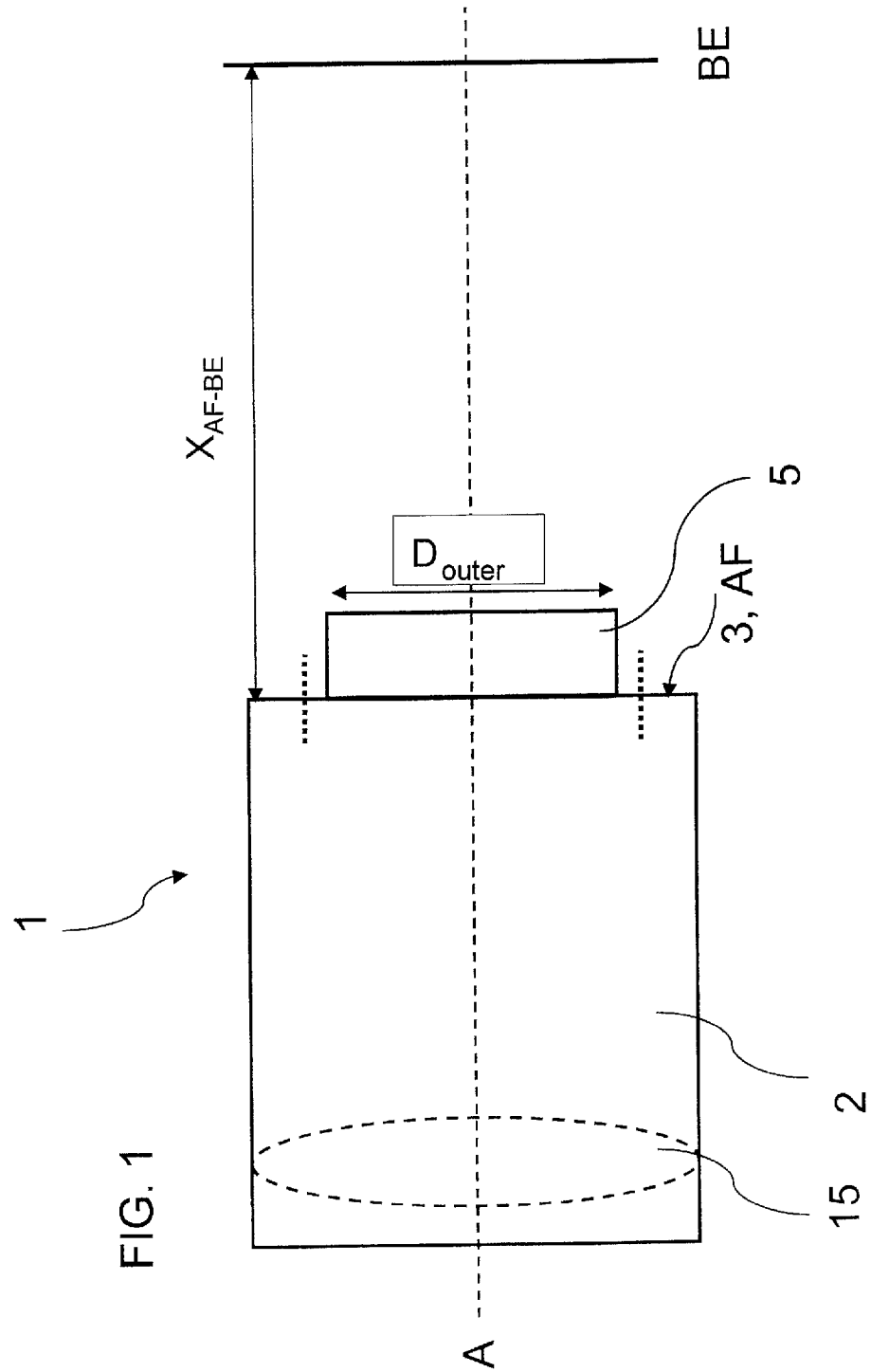
FIG. 1 shows a focusing mount.

FIG. 1 shows a focusing mount 2 of a camera lens assembly 1. The focusing mount 2 is at a defined distance from a contact surface 3 of the focusing mount 2 on the camera side to the camera image plane BE of $X_{AF\text{-}BE} \geqq 57.9$ mm when the camera lens 1 is fixed to a camera 4.

Furthermore, the focusing mount 2 has a receiving lug 5 with an outer diameter of $D_{AZ,\,outer} \leqq 52$ mm for receiving an adapter ring 6.

Furthermore, the focusing mount 2 has optical elements which are arranged in the focusing mount and define an optical axis A. At least one of the optical elements can be moved along the optical axis A via at least one focusing ring, not shown. As an example, an optical element 15, here a lens, is shown in dotted lines.

The dimensions are chosen such that a PL-mount can be attached directly on the focusing mount 2 in order to form a camera lens 1 therewith. An adapter ring 6 is provided so that other mounts can also be attached. This is shown in FIG. 2.

The adapter ring 6 has a first planar surface 9 and a second planar surface 10 which are plane-parallel to one another. The first planar surface 9 is arranged on the contact surface 3 of the focusing mount 2 on the camera side and the second planar surface 10 lies on a contact surface 11 of the lens mount 8 on the lens side.

Attachment or fixing elements 7 are provided for fixing the adapter ring 6 on the focusing mount 2. The fixing elements 7 are configured as screw connections in the present embodiment. Threaded bores for a screw connection can be provided in the focusing mount and/or the adapter ring. Alternatively, simple bores for a screw-nut connection can be provided.

Figure 2:
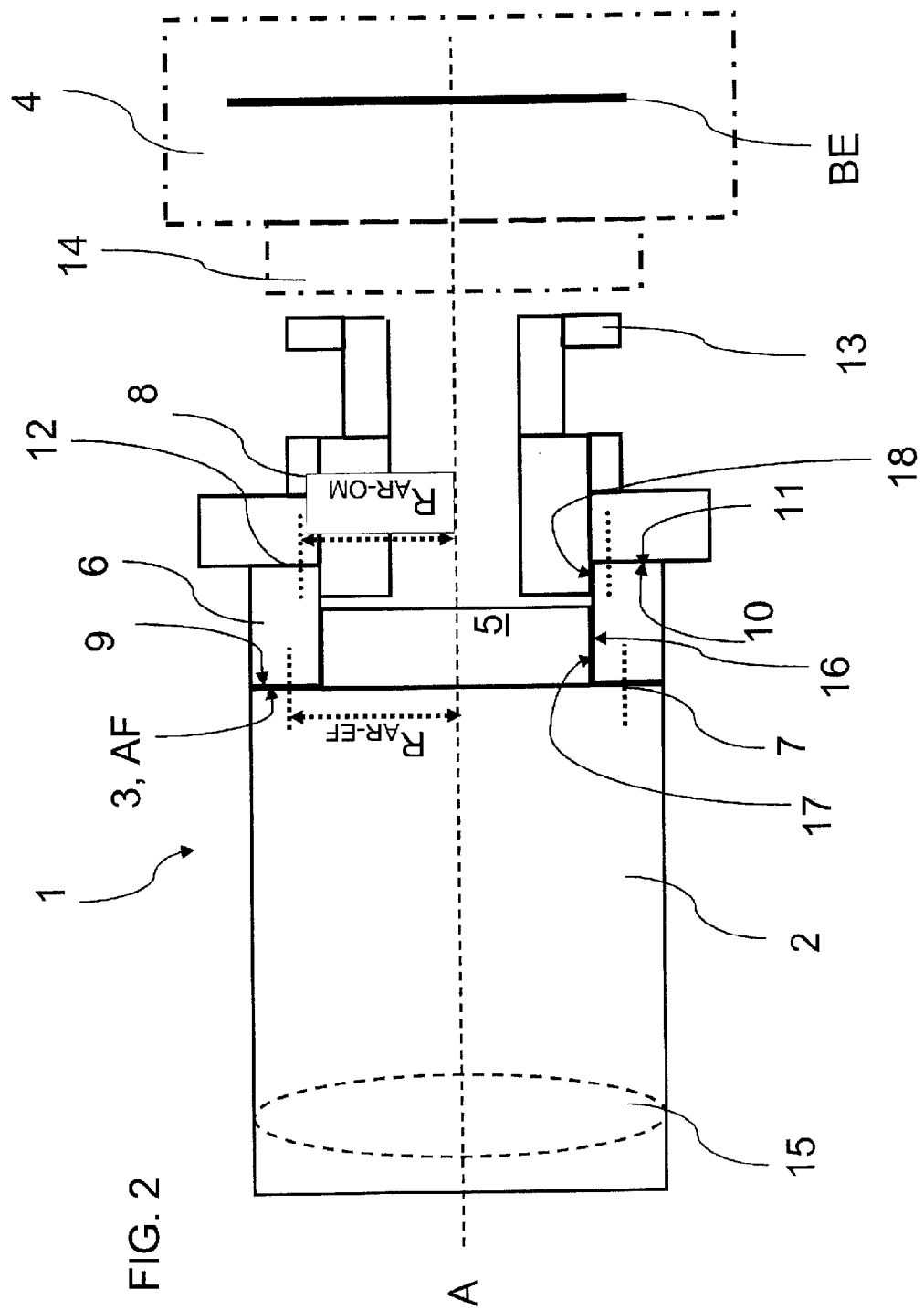
FIG. 2 shows a camera lens with an adapter ring.

The axes of the screw connection for fixing the adapter ring 6 to the focusing mount 2 and the axes of the screw connection for fixing the lens mount 8 to the adapter ring 6 are shown in phantom outline in FIG. 2. At least one screw connection is provided in order to connect two components to each other. Preferably four, five, six, seven, eight, or more screw connections are provided for each component connection. For example, these screw connections can be arranged in a ring-shaped manner at a uniform distance from each other. An asymmetrical arrangement of the screw connections is also possible. For example, four asymmetrically arranged screw connections can be provided for fixing the lens mount 8 on the adapter ring 6 and eight symmetrically arranged screw connections can be provided for fixing the adapter ring 6 on the focusing mount 2.

In the present embodiment, the lens mount 8 is configured as an EF-mount. Other lens mounts can also be used, however. Such lens mounts have a tube-shaped lens mount socket. In addition, they have lens mount fixing elements 13 which are configured to coact with the camera mount attachment or fixing elements 14 of a camera 4. For example, these mounts, that is, the camera mount together with the lens mount can be configured as threaded coupling or bayonet connection. In the present embodiment a bayonet connection is shown.

Furthermore, attachment or fixing elements 12 for fixing the lens mount 8 on the adapter ring 6 are provided. The fixing elements 12 are configured as screw connections in the present embodiment. Threaded bores can be provided in the lens mount and/or the adapter ring. Alternatively, simple bores for a screw-nut connection may be provided.

The adapter ring 6 has a contact surface 16 which rests against a contact surface 17 of the receiving lug 5 and a contact surface 18 of the lens mount 8. These three contact surfaces (16, 17, 18) extend in parallel to the optical axis A.

The optics of the camera lens 1, which define the optical axis A, are arranged in the focusing mount 2. An optical lens 15 is shown in dotted lines in the focusing mount 2 as an example.

Figure 3:
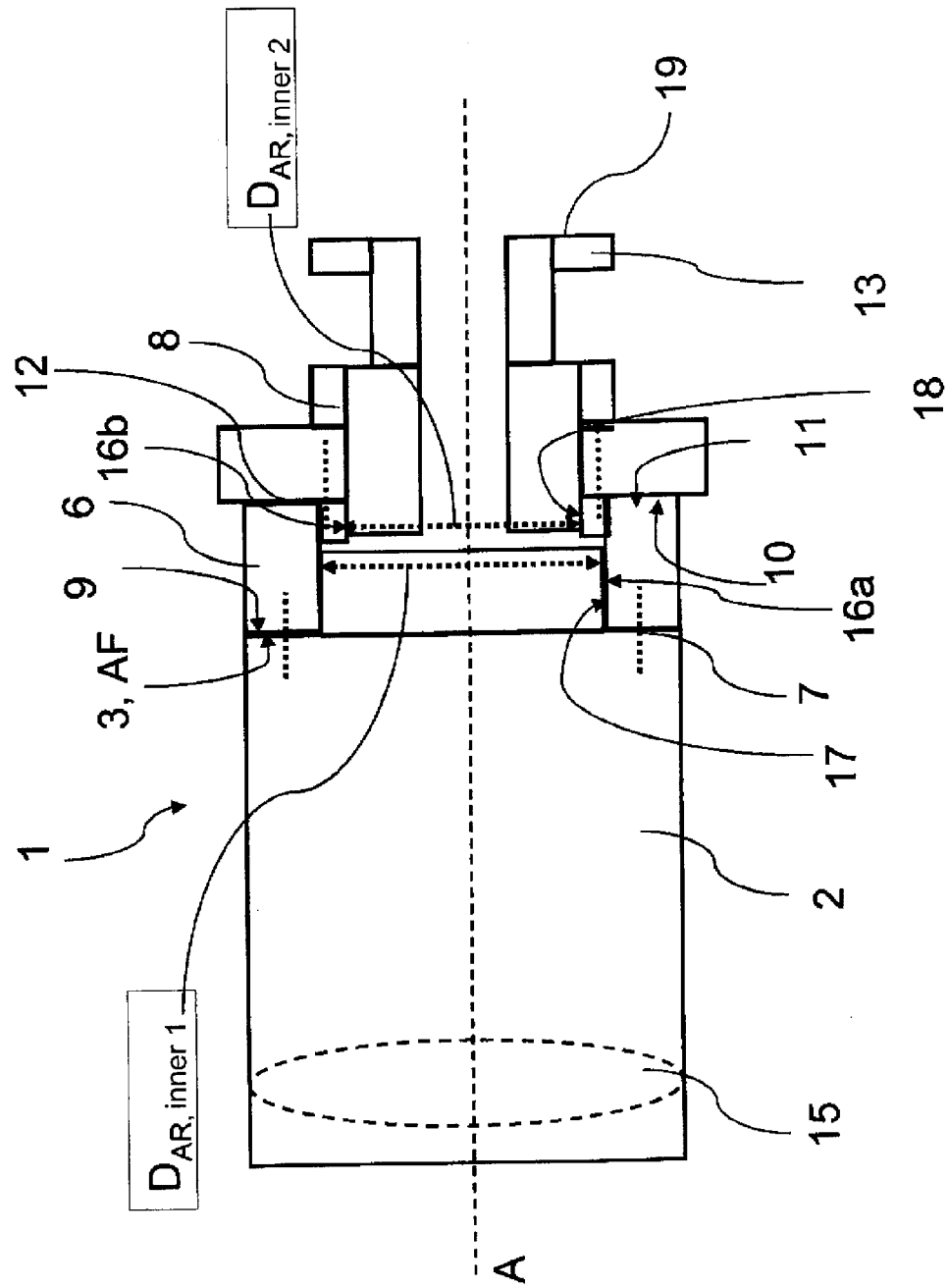
FIG. 3 shows a camera lens with a further embodiment of the adapter ring.

FIG. 3 shows that the contact surface 17 has a first diameter $D_{AZ,\,outer}$ and the contact surface 18 has a second diameter $D_{OM}$. $D_{AZ, outer} \neq D_{OM}$ and the contact surface (16a, 16b) of the adapter ring 6 is configured in a stepped manner, that is, configured with at least two different diameters $D_{AR, inner\ 1}$ and $D_{AR, inner\ 2}$.

Figure 4:
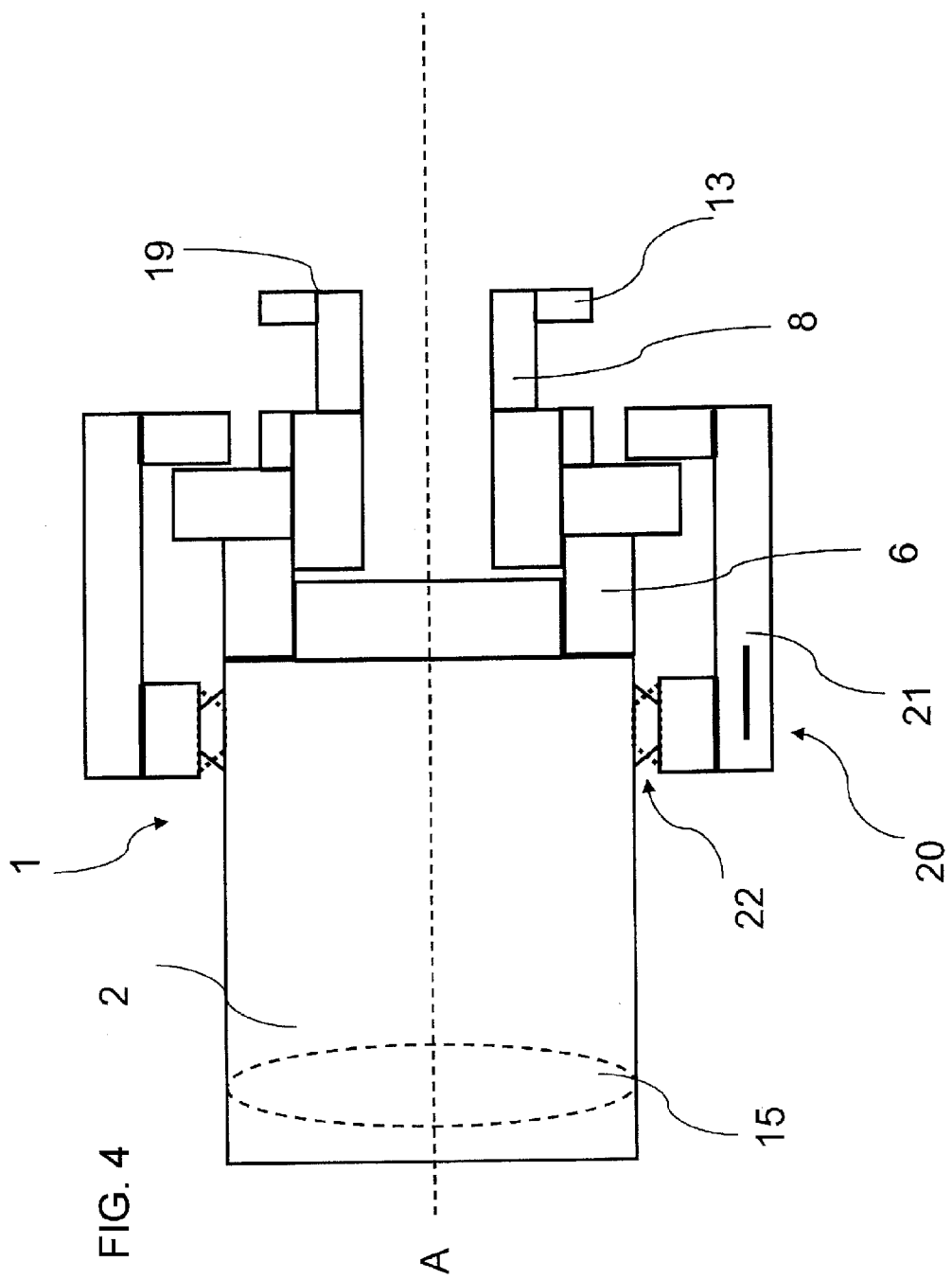
FIG. 4 shows a pre-screw retaining coupling.

FIG. 4 shows a camera lens 1, in which the fixing elements 7 for fixing the adapter ring 6 on the focusing mount 2, and the fixing elements 12 for fixing the lens mount 8 on the adapter ring 6 are configured as a common pre-screw retaining ring 21. The pre-screw retaining ring 21 can be configured in such a manner that an outer thread 22 is provided on the focusing mount 2 on which a pre-screw retaining ring 21 engages over the adapter ring 6.

Figure 5:
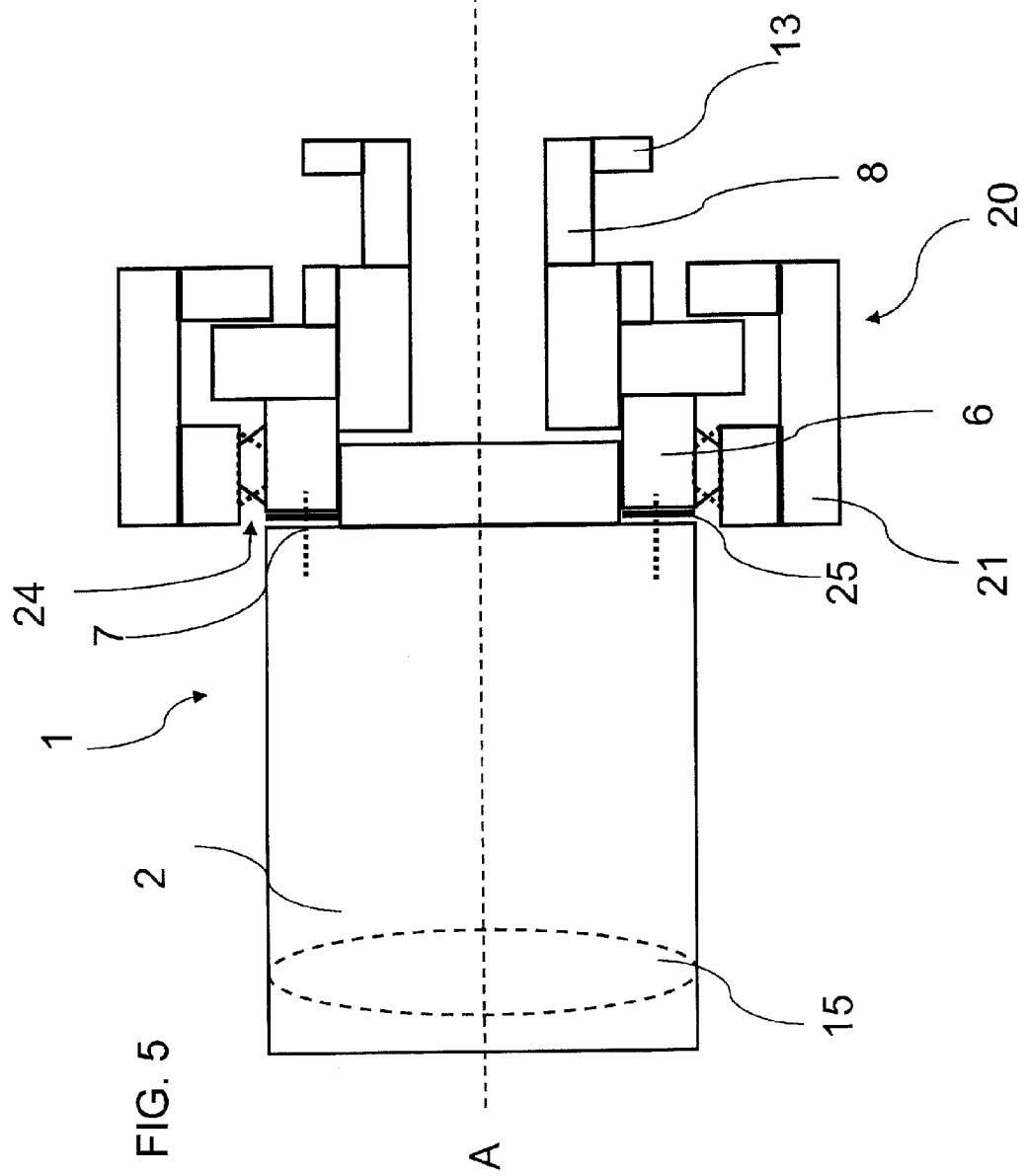
FIG. 5 shows an alternative pre-screw retaining coupling.

FIG. 5 alternatively shows that the pre-screw retaining ring 21 only connects the adapter ring 6 to the lens mount 8. An outer thread 24 is provided on the adapter ring 6. A screw connection or a further pre-screw retaining ring, for example, can be provided as a connection from the adapter ring 6 to the focusing mount 2.

FIG. 5 further shows a shim 25 or spacer. Shims are thin discs made of plastic or metal that function as spacers but do not have a load-bearing function, and can have a thickness of only 1/100 mm viewed in the longitudinal direction of the optical axis A. These shims are pierced by the fixing elements 7 and are fixed thereby. One or more shims can be used to optimize the distance from the focusing mount 2 or their contact surfaces 3 to the image plane BE in order to achieve an optimum image. These shims 25 can be used in different embodiments of the invention.

Figure 6:
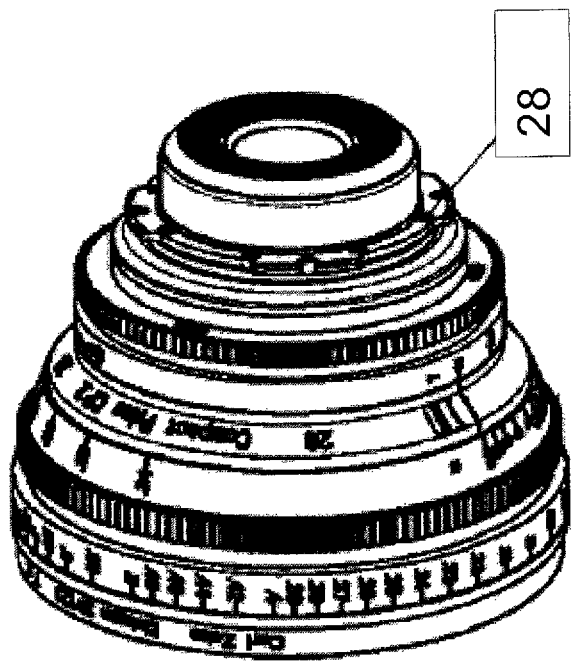
FIG. 6 shows a section view through the focusing mount with PL-Mount and cover ring.
Figure 7:
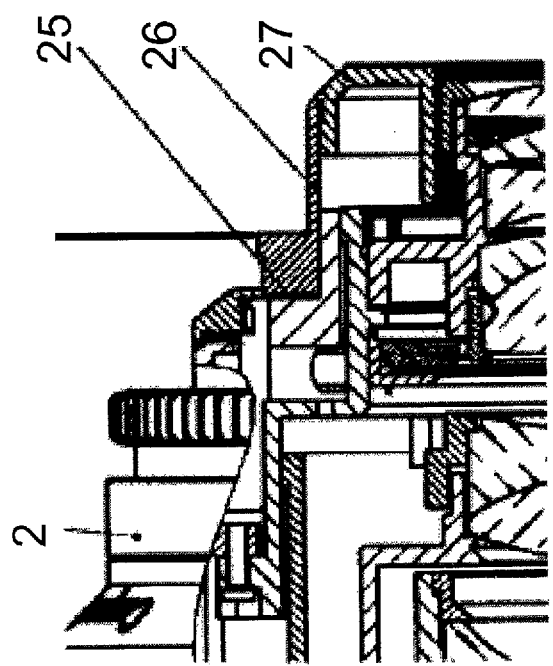
FIG. 7 shows a focusing mount with a PL-Mount and cover ring according to FIG. 6.

FIGS. 6 and 7 show a focusing mount 2 with PL-lens mount 26, shim 25, and cover ring 27. There is a screw connection with eight symmetrically distributed screws 28 between the focusing mount 2 and the PL-lens mount 26. The cover ring 27 prevents dirt from entering into the lens. The flange focal distance is 52 mm.

Figure 8:
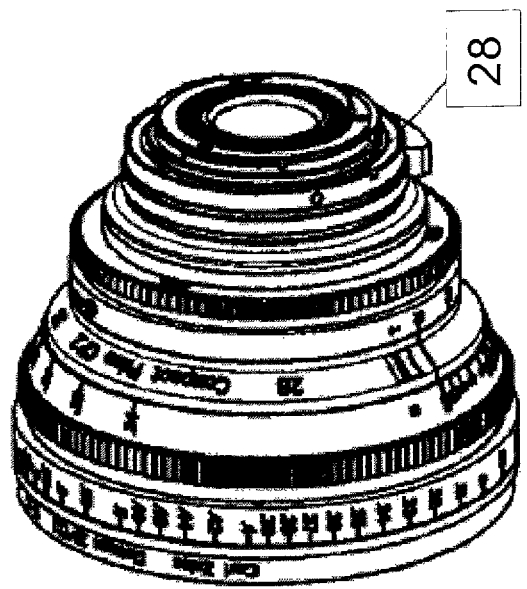
FIG. 8 shows a section view through a focusing mount with EF-Mount, adapter ring, and cover ring; and, FIG. 9 shows a focusing mount with EF-Mount, adapter ring and cover ring according to FIG. 8.
Figure 9:
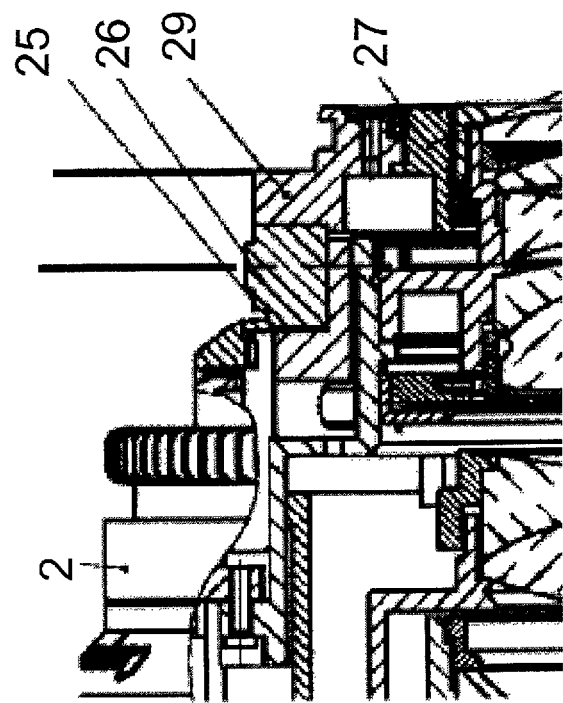

FIGS. 8 and 9 show a focusing mount 2 with EF-lens mount 29, adapter ring 6, shim 25, and cover ring 27. There is a screw connection with four asymmetrically distributed screws 28 between the focusing mount 2 and the PL-lens mount 26. The cover ring 27 prevents dirt from entering the lens. The focal flange distance is 44 mm. (see above)

The camera lens assembly 1 of the invention includes:
(1) a focusing mount 2 having:
   (a) a defined distance from the camera-side contact surface 3 of the focusing mount 2 to the camera image plane BE of $X_{AF-BE} \geq 57.9$ mm when the camera lens assembly 1 is attached to a camera 4;
   (b) a receiving lug 5 having an outer diameter of $D_{AZ, outer} \leq 52$ mm for receiving an adapter ring 6; and,
   (c) optical elements 15, which are arranged in the focusing mount 2, and define an optical axis A;
(2) the adapter ring 6 having a first planar surface 9 and a second planar surface 10, which are parallel to each other; the first planar surface 9 being in contact engagement against the camera-side contact surface 3 of the focus mount 2 and the second planar surface 10 being in contact engagement with a lens-side contact surface 11 of the lens mount 8;
(3) attachment element 7 for attaching the adapter ring 6 to the focusing mount 2;
(4) the lens mount 8 having:
   (a) a tubular-shaped lens mount socket; and,
   (b) lens mount attachment elements 13, which are configured to coact with the camera mount attachment elements 14 of a camera 4; and,
(5) attachment elements 12 for attaching the lens mount 8 to the adapter ring 6.

According to another feature of the invention, the camera lens assembly 1 is characterized in that the attachment elements 7 for attaching the adapter ring 6 to the focusing mount are at a distance $R_{AR-EF}$ from the optical axis A; and, the attachment elements 12 for attaching the lens mount 8 to the adapter ring 6 have a distance $R_{AR-OM}$ wherein $R_{AR-EF} \neq R_{AR-OM}$.

According to another feature of the invention, $R_{AR-EF} > R_{AR-OM}$.

According to another feature of the invention, the camera-side contact surface 3 of the focusing mount 2 and the lens-side contact surface 11 of the lens mount 8 are planar-parallel to each other and are perpendicular to the optical axis A.

According to another feature of the invention, the attachment elements 7 for attaching the adapter ring 6 to the focusing mount 2 and/or the attachment elements 12 for attaching the lens mount 8 to the adapter ring 6 are configured as threaded fastener connections.

According to another feature of the invention, the attachment elements 7 for attaching the adapter ring 6 to the focusing mount 2 and/or the attachment elements 12 for attaching the lens mount 8 to the adapter ring 6 are configured as threaded fastener connections with three, four, five, six, seven, eight or more bores.

According to another feature of the invention, the bores are threaded bores.

According to another feature of the invention, the attachment elements 7 for attaching the adapter ring 6 to the focusing mount 2 and/or the attachment elements 12 for attaching the lens mount 8 to the adapter ring 6 are configured as a pre-screw retaining coupling.

According to still another feature of the invention, a common pre-screw retaining coupling is provided for the focusing mount 2, adapter ring 6 and lens mount 8.

According to another feature of the invention, the adapter ring 6 has a contact surface 16 which is in contact engagement with a contact surface 17 of the receiving lug 5 and a contact surface 18 of the lens mount 13; and, these three contact surfaces (16, 17, 18) extend parallel to the optical axis A.

According to still another feature of the invention, the contact surface 17 has a first diameter $D_{AZ, outer}$ and the contact surface 18 has a second diameter $D_{OM}$ wherein $D_{AZ, outer} \neq D_{OM}$ and the contact surfaces (16a, 16b) are configured to be stepwise, that is, with at least two different diameters $D_{AR, inner\ 1}$ and $D_{AR, inner\ 2}$ so that contact surface 17 lies in contact engagement with contact surface 16a and contact surface 18 with contact surface 16b.

In still another feature of the invention, one or several shims 25 are arranged between the adapter ring 6 and the contact surface 3 of the focusing mount 2.

The adaptation set of the invention is for the exchangeable connection of respective ones of lens mounts from a group of differently formed lens mounts to a focusing mount 2 of a camera lens 1. The adaptation set includes an adapter ring 6 having a first planar surface 9 and a second planar surface 10 which are planar-parallel to each other; the first planar surface 9 can be placed in contact with a camera-side contact surface 3 of the focusing mount 2 and the second planar surface 10 can be placed against a lens-side contact surface 11 of a lens mount 8; and, the lens mount 8 has a tube-shaped lens mount socket as well as lens mount attachment elements 13 which are configured to coact with camera mount attachment elements 14 of a camera 4.

According to another feature of the adaptation set of the invention, four, five, six, seven, eight or more bores are configured for the attachment of the adapter ring 6 to the focusing mount 2 and/or for the attachment of the lens mount 8 to the adapter ring 6 in the region of the adapter ring; and, the number of bores for attaching to the focusing mount 2 can be equal to or unequal to the number of bores for attaching to the lens mount 8.

According to another feature of the invention, the bores are threaded bores.

According to still another feature of the adaptation set of the invention, the bores for attaching the adapter ring 6 to the focusing mount are at a distance $R_{AR\text{-}EF}$ from the mechanical axis A; and, the bores for the attachment of the lens mount 8 to the adapter ring 6 have a distance $R_{AR\text{-}OM}$; and, wherein $$R_{AR\text{-}EF} \neq R_{AR\text{-}OM}.$$

According to another feature of the invention, $R_{AR\text{-}EF} > R_{AR\text{-}OM}$.

According to another feature of the adaptation set of the invention, the adapter ring 6 has a contact surface 16 which can be placed against a contact surface 17 of a receiving lug 5 and on a contact surface 18 of a lens mount 13; and, the contact surface 16 extends parallel to the mechanical axis A of the adapter ring and has a minimum inner diameter $D_{AR,\ inner} \geq 52$ mm.

According to another feature of the invention, the contact surfaces (16a, 16b) are step-shaped, that is, they are configured to have at least two different diameters D and $D_{AR,\ inner\ 2}$.

According to still another feature of the adaptation set of the invention, the adaptation set allows one lens mount or several lens mounts of different structural type to be connected to the adapter ring 6.

According to still another feature of the invention, the adaptation set can include one or several shims 25.

In a preferred embodiment of the invention the following dimensions are provided:

Focusing mount:
Distance from contact surface to image plane: minimum 57.9 mm
Receiving lug diameter: Maximum 52 mm
Hole circle diameter with eight screws: 58 mm
Adapter ring:
Outer diameter: 66 mm
Inner diameter: 52 mm
Length: 8.8 mm
Hole circle diameter with eight screws: 58 mm (bores)
Hole circle diameter with four screws: 59 mm (threaded bores)

It is understood that the foregoing description is that of the preferred embodiments of the invention and that various changes and modifications may be made thereto without departing from the spirit and scope of the invention as defined in the appended claims.

REFERENCE NUMERAL LIST

1 Camera lens assembly
2 Focusing mount
3 Contact surface or support surface of the focusing mount
4 Camera
5 Receiving lug
6 Adapter ring
7 Attachment elements
8 Lens mount
9 First planar surface of the adapter ring
10 Second planar surface of the adapter ring
11 Lens-side contact or support surface of the lens mount
12 Attachment elements
13 Lens mount attachment elements
14 Camera mount attachment elements
15 Optical element
16, 16a, 16b Contact surface or support surface of the adapter ring which extends parallel to the optical axis A
17 Contact or support surface of the receiving lug which extends parallel to the optical axis A
18 Contact or support surface of the lens mount which extends parallel to the optical axis A
19 Camera-side contact or support surface of the lens mount on a camera mount
20 Pre-screw retaining coupling
21 Pre-screw retaining ring
22 Threaded connection of the pre-screw retaining ring to the focusing mount
24 Threaded connection of the pre-screw retaining ring to the adapter ring
25 Shim
26 PL-lens mount
27 Cover ring
28 Screws
29 EF-lens mount
A Optical axis, mechanical axis
AF. Camera-side contact or support surface 3
AR Adapter ring
BE Image plane in the camera
$D_{AR,\ inner\ 1}$ First inner diameter of the adapter ring
$D_{AR,\ inner\ 2}$ Second inner diameter of the adapter ring
$D_{AZ,\ outer}$ Outer diameter of the receiving lug
$D_{OM}$ Diameter of the axial parallel contact or support surface of the lens mount
EF Focusing mount
OM Lens mount
$R_{AR\text{-}OM}$ Distance of the attachment elements "adapter ring-lens mount" to the optical axis A
$R_{AR\text{-}EF}$ Distance of the attachment elements "adapter ring-focusing mount" to the optical axis A
$X_{AF\text{-}BE}$ Defined distance of the camera-side contact or support surface 3 of the focusing mount to BE

What is claimed is:

1. A camera lens assembly for coacting with a camera defining an image plane (BE) and camera mount fixing elements, the camera lens assembly comprising:

a lens mount having a tube-shaped lens mount socket and lens mount fixing elements configured to coact with said camera mount fixing elements;

said lens mount having a support surface;

a focusing mount having a support surface facing said camera;

said support surface of said focusing mount being at a defined distance from said camera image plane (BE) of $X_{AF\text{-}BE} \geq 57.9$ mm when said camera lens assembly is fixed to said camera;

an adapter ring having first and second planar surfaces plane parallel to each other;

said adapter ring being an element separate from said focusing mount and said lens mount so as to be non-integral therewith;

said first planar surface of said adapter ring being in contact engagement with said support surface of said focusing mount and said second planar surface of said adapter ring being in contact engagement with said support surface of said lens mount;

said focusing mount having a receiving lug having an outer diameter of $D_{AZ,\ outer} \leq 52$ mm and being adapted for receiving said adapter ring and said focusing mount having optical elements arranged therein and said optical elements defining an optical axis A;

a first fixing unit for fixing said adapter ring on said focusing mount; and, a second fixing unit for fixing said lens mount on said adapter ring.

2. The camera lens assembly of claim 1, wherein said support surface of said focusing mount and said support surface of said lens mount are plane parallel to each other and perpendicular to said optical axis A.

3. The camera lens assembly of claim 1, wherein at least one of said first fixing unit and said second fixing unit is configured as a threaded fastener connection.

4. The camera lens assembly of claim 1, wherein at least one of said first fixing unit and said second fixing unit is configured as a threaded fastener connection having at least three bores.

5. The camera lens assembly of claim 4, wherein said bores are threaded bores.

6. The camera lens assembly of claim 1, wherein at least one of said first fixing unit and said second fixing unit is configured as a pre-screw retaining coupling.

7. The camera lens assembly of claim 6, wherein a common pre-screw retaining coupling is configured for said focusing mount, said adapter ring and said lens mount.

8. The camera lens assembly of claim 1, wherein:
said adapter ring has a third support surface;
said receiving lug has a support surface;
said lens mount has a second support surface;
said third support surface of said adapter ring is in contact engagement with said support surface of said receiving lug and with said second support surface of said lens mount; and,
said third support surface of said adapter ring, said support surface of said receiving lug and said second support surface of said lens mount extend parallel to said optical axis A.

9. The camera lens assembly of claim 8, wherein:
said support surface of said receiving lug has a first diameter $D_{AZ,\ outer}$;
said second support surface of said lens mount has a second diameter $D_{OM}$;
wherein $D_{AZ,\ outer} \neq D_{OM}$;
said third support surface of said adapter ring has a stepped configuration defining a first component surface and a second component surface having respective diameters $D_{AR,\ inner\ 1}$ and $D_{AR,\ inner\ 2}$; said first component surface is in contact engagement with said support surface of said retaining lug and said second component surface is in contact engagement with said second support surface of said lens mount.

10. The camera lens assembly of claim 1, wherein said first and second planar surfaces of said adapter ring are uninterrupted planar surfaces.

11. A camera lens assembly for coacting with a camera defining an image plane (BE) and camera mount fixing elements, the camera lens assembly comprising:
a lens mount having a tube-shaped lens mount socket and lens mount fixing elements configured to coact with said camera mount fixing elements;
said lens mount having a support surface;
a focusing mount having a support surface facing said camera;
said support surface of said focusing mount being at a defined distance from said camera image plane (BE) of $X_{AF-BE} \geq 57.9$ mm when said camera lens assembly is fixed to said camera;
an adapter ring having first and second planar surfaces plane parallel to each other;
said first planar surface of said adapter ring being in contact engagement with said support surface of said focusing mount and said second planar surface of said adapter ring being in contact engagement with said support surface of said lens mount;
said focusing mount having a receiving lug having an outer diameter of $D_{AZ,\ outer} \leq 52$ mm and being adapted for receiving said adapter ring and said focusing mount having optical elements arranged therein and said optical elements defining an optical axis A;
a first fixing unit for fixing said adapter ring on said focusing mount;
a second fixing unit for fixing said lens mount on said adapter ring;
said first fixing unit for fixing said adapter ring on said focusing mount being at a distance $R_{AR-EF}$ from said optical axis A;
said second fixing unit for fixing said lens mount on said adapter ring being at a distance $R_{AR-OM}$ to said optical axis A; and,
said distance $R_{AR-EF}$ being not equal to said distance $R_{AR-OM}$.

12. The camera lens assembly of claim 11, wherein said distance $R_{AR-EF}$, is greater than $R_{AR-OM}$.

13. A camera lens assembly for coacting with a camera defining an image plane (BE) and camera mount fixing elements, the camera lens assembly comprising:
a lens mount having a tube-shaped lens mount socket and lens mount fixing elements configured to coact with said camera mount fixing elements;
said lens mount having a support surface;
a focusing mount having a support surface facing said camera;
said support surface of said focusing mount being at a defined distance from said camera image plane (BE) of $X_{AF-BE} \geq 57.9$ mm when said camera lens assembly is fixed to said camera;
an adapter ring having first and second planar surfaces plane parallel to each other;
said first planar surface of said adapter ring being in contact engagement with said support surface of said focusing mount and said second planar surface of said adapter ring being in contact engagement with said support surface of said lens mount;
said focusing mount having a receiving lug having an outer diameter of $D_{AZ,\ outer} \leq 52$ mm and being adapted for receiving said adapter ring and said focusing mount having optical elements arranged therein and said optical elements defining an optical axis A;
a first fixing unit for fixing said adapter ring on said focusing mount;
a second fixing unit for fixing said lens mount on said adapter ring; and,
at least one shim arranged between said adapter ring and said support surface of said focusing mount.

14. An adaptation set for an interchangeable connection of a lens mount selected from a group of differently formed lens mounts on a focusing mount of a camera lens for a camera, each of the lens mounts having a support surface on the lens side thereof; the focusing mount having a support surface facing the camera; the adaptation set comprising:
an adapter ring having first and second planar surfaces plane parallel with each other;
said adapter ring being an element separate from said focusing mount and said lens mount so as to be non-integral therewith;

said first planar surface of said adapter ring being placeable against said support surface of said focusing mount;

said second planar surface of said adapter ring being placeable against said support surface of said lens mount; and, said lens mount having a tube-shaped lens mount socket and a lens mount fixing unit which are configured to coact with a camera mount fixing unit of said camera.

15. The adaptation set of claim 14, wherein said lens mount has a second support surface; and, said focusing mount has a receiving lug having a support surface; said adapter ring has a third support surface placeable against said support surface of said receiving lug and said second surface of said lens mount; and, said third support surface of said adapter ring extends parallel to said mechanical axis A and has a minimum inner diameter $D_{AR, inner} \geq 52$ mm.

16. The adaptation set of claim 14, wherein:
said adapter ring has a stepped support surface with at least two different diameters $D_{AR, inner\ 1}$ and $D_{AR, inner\ 2}$.

17. The adaptation set of claim 14, further comprising one lens mount configured to connect to said adapter ring or a plurality of lens mounts having respectively different configurations.

18. The adaptation set of claim 14, wherein said first and second planar surfaces of said adapter ring are uninterrupted planar surfaces.

19. An adaptation set for an interchangeable connection of a lens mount selected from a group of differently formed lens mounts on a focusing mount of a camera lens for a camera, each of the lens mounts having a support surface on the lens side thereof; the focusing mount having a support surface facing the camera; the adaptation set comprising:

an adapter ring having first and second planar surfaces plane parallel with each other;

said first planar surface of said adapter ring being placeable against said support surface of said focusing mount;

said second planar surface of said adapter ring being placeable against said support surface of said lens mount; and, said lens mount having a tube-shaped lens mount socket and a lens mount fixing unit which are configured to coact with a camera mount fixing unit of said camera;

at least four bores arranged in the area of said adapter ring;

said bores being configured to attach the adapter ring on at least one of said focusing mount and said lens mount; and, wherein the number of said bores for attachment of said adapter ring to said focusing mount can be equal or unequal to the number of said bores for attachment of said adapter ring to said lens mount.

20. The adaptation set of claim 19, wherein said bores are threaded bores.

21. The adaptation set of claim 19, wherein:
said adapter ring defines a mechanical axis;
said bores for attachment of said adapter ring to said focusing mount are at a distance $R_{AR-EF}$ from said mechanical axis A;
said bores for attachment of said lens mount to said adapter ring are at a distance $R_{AR-OM}$ from said mechanical axis A; and,
said distance $R_{AR-EF} \neq$ said distance $R_{AR-OM}$.

22. The adaptation set of claim 21, wherein $R_{AR-EF} > R_{AR-OM}$.

23. An adaptation set for an interchangeable connection of a lens mount selected from a group of differently formed lens mounts on a focusing mount of a camera lens for a camera, each of the lens mounts having a support surface on the lens side thereof; the focusing mount having a support surface facing the camera; the adaptation set comprising:

an adapter ring having first and second planar surfaces plane parallel with each other;

said first planar surface of said adapter ring being placeable against said support surface of said focusing mount;

said second planar surface of said adapter ring being placeable against said support surface of said lens mount; and, said lens mount having a tube-shaped lens mount socket and a lens mount fixing unit which are configured to coact with a camera mount fixing unit of said camera; and, at least one shim arranged between said adapter ring and one of said support surfaces.

24. The adaptation set of claim 23, wherein said one support surface is said support surface of said focusing mount.

* * * * *

UNITED STATES PATENT AND TRADEMARK OFFICE
CERTIFICATE OF CORRECTION

PATENT NO. : 8,430,581 B2  
APPLICATION NO. : 13/023972  
DATED : April 30, 2013  
INVENTOR(S) : Uwe Weber et al.

Page 1 of 1

It is certified that error appears in the above-identified patent and that said Letters Patent is hereby corrected as shown below:

In the Specification

In Column 7:
Line 24: delete "D" and substitute -- $D_{AR, inner1}$ -- therefor.

Signed and Sealed this
Eleventh Day of June, 2013

Teresa Stanek Rea
*Acting Director of the United States Patent and Trademark Office*